Nov. 1, 1960 H. PIKAL 2,958,308
PEANUT APPLIER FOR APPLE COATING MACHINES
Filed July 24, 1958 3 Sheets-Sheet 1
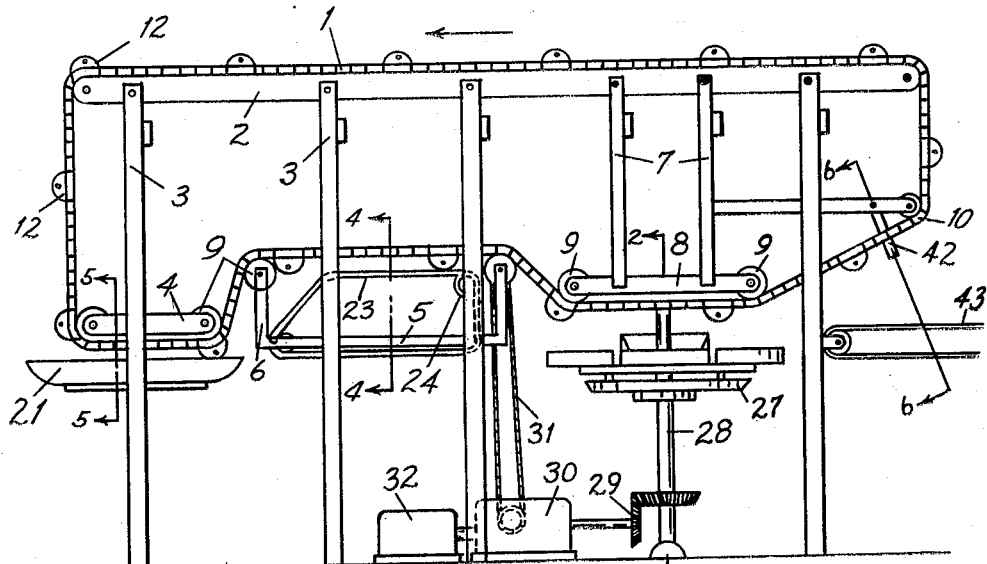
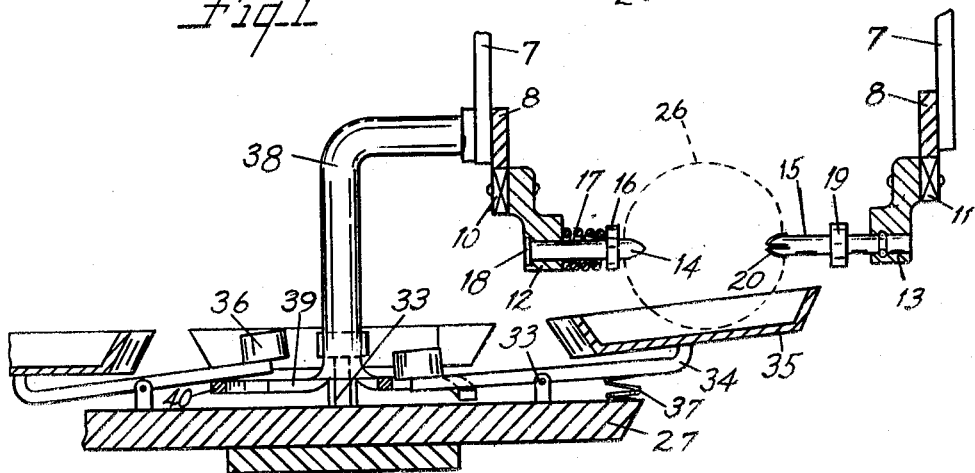
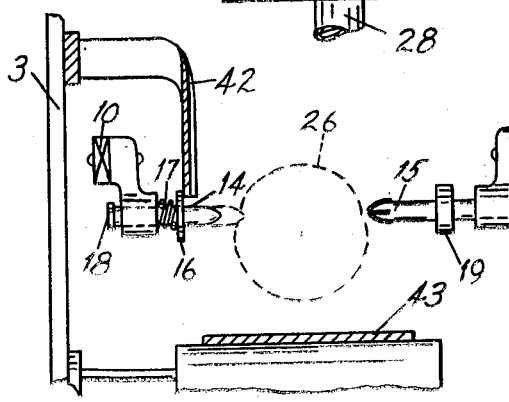
INVENTOR.
Harry Pikal
BY
ATTORNEY Nov. 1, 1960 H. PIKAL 2,958,308
PEANUT APPLIER FOR APPLE COATING MACHINES
Filed July 24, 1958 3 Sheets-Sheet 2

INVENTOR.
Harry Pikal
BY
ATTORNEY

Nov. 1, 1960 H. PIKAL 2,958,308
PEANUT APPLIER FOR APPLE COATING MACHINES
Filed July 24, 1958 3 Sheets-Sheet 3
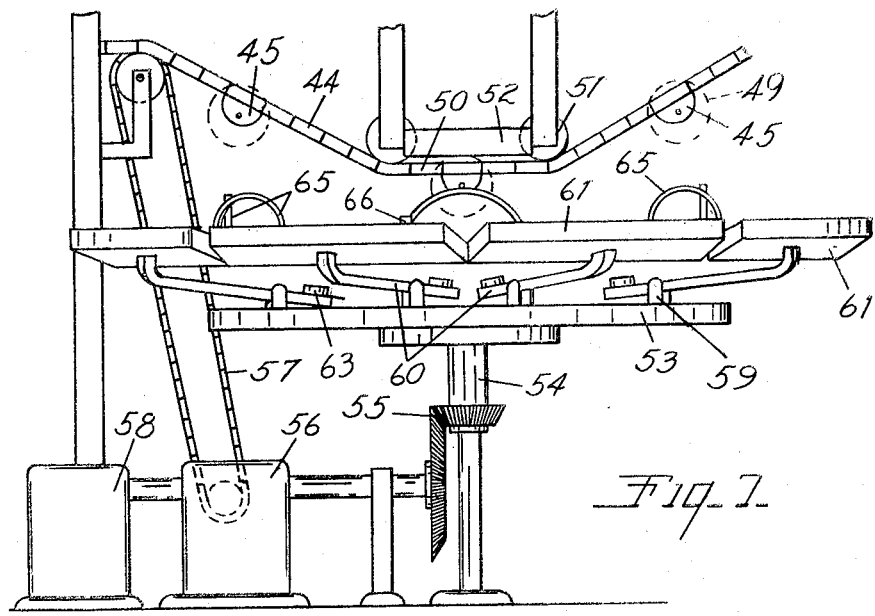
Fig. 7
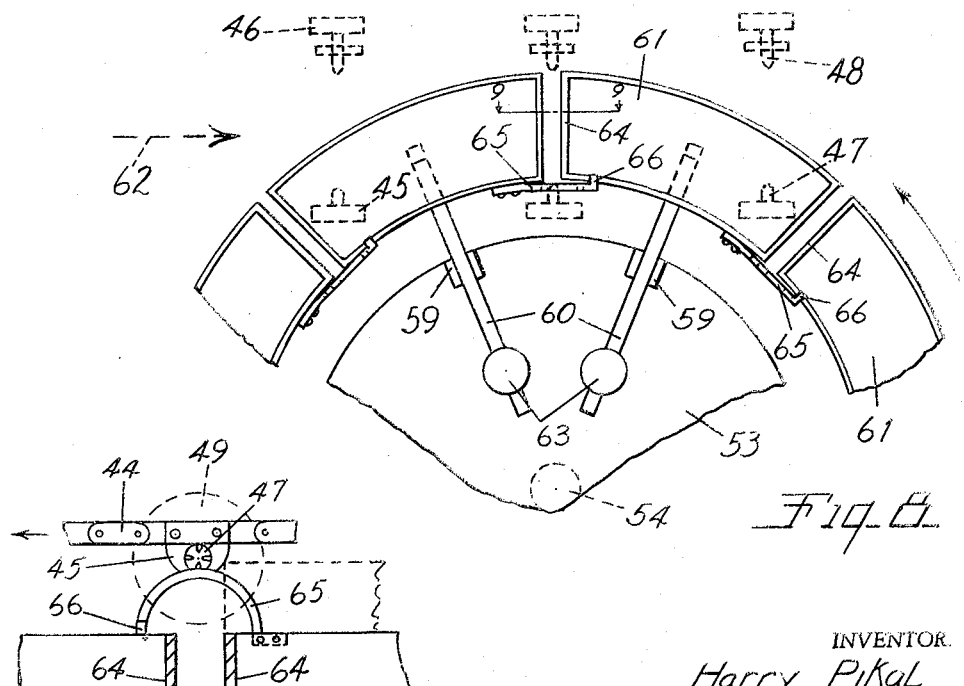
Fig. 8
Fig. 9
INVENTOR.
Harry Pikal
BY
ATTORNEY

United States Patent Office 2,958,308
Patented Nov. 1, 1960

2,958,308

PEANUT APPLIER FOR APPLE COATING MACHINES

Harry Pikal, Bangor, Mich.

Filed July 24, 1958, Ser. No. 750,607

12 Claims. (Cl. 118—16)

This invention relates to improvements in machines for coating apples with caramel and nut meats. The principal objects of this invention are:

First, to provide an improved apparatus for applying crushed nut meats or other fragmented confections to the freshly caramel coated surfaces of apples as the apples are advancing from the caramel coating operation. The peanut applying apparatus is characterized by its ability to adapt to different sized apples.

Second, to provide an improved apple coating machine which can be operated at relatively high speed and which maintains the apples under positive control at all times for a rolling motion through a tank of caramel and a rapid spinning motion for removal of excess caramel and a rolling motion over a pan of nut meats applied at uniform pressure to the fresh coated surface of the apples regardless of the size of the apple to firmly press a layer of nut meats into the fresh caramel coating.

Third, to provide a nut meat applying apparatus that will yieldably lift a pan of nut meats to the bottom of coated apples and rotate oppositely to the direction of motion of the apples as the apples are moved successively along a conveyor, the apparatus being effective to lower the peanut supporting structure as each apple is coated and carried away.

Other objectives and advantages of the invention will be apparent from a consideration of the following description and claims. The drawings, of which there are three sheets, illustrate a highly practical form of the apple coating machine and two forms of the peanut applying mechanism thereof.

Fig. 1 is a side elevational view of the complete coating machine, some parts being illustrated conventionally.

Fig. 2 is a fragmentary transverse vertical cross sectional view through the peanut applying apparatus and a portion of the conveyor of the coating machine, taken along the plane of the line 2—2 in Figs. 1 and 3.

Fig. 6 is a fragmentary transverse cross sectional view taken along the plane of the line 6—6 in Fig. 1 and illustrating the discharge end of the coating machine.

Fig. 7 is a fragmentary side elevational view of a modified form of peanut applying mechanism arranged in cooperative relation to the apple dipping and advancing conveyor.

Fig. 8 is a fragmentary top plan view of the peanut applying mechanism shown in Fig. 7, portions of the apple advancing conveyor being indicated by dotted lines.

Fig. 9 is a fragmentary vertical cross sectional view taken along the plane of the line 9—9 in Fig. 8 and looking in the direction of the arrows.

Figure 3:
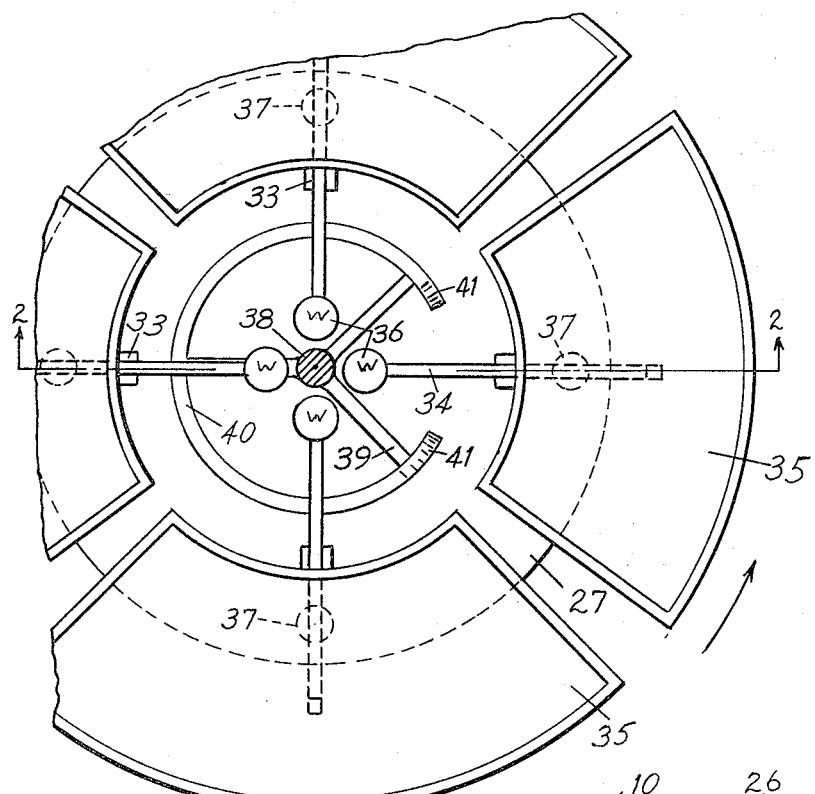
Fig. 3 is a fragmentary plan view of the peanut feeding and applying portion of the machine.

In my co-pending applications Serial No. 635,076, filed January 18, 1957, now Patent No. 2,870,736, and Serial No. 547,057 filed November 16, 1955, now Patent No. 2,889,801, I have described machines for coating apples with caramel and nut meats by holding the apples directly with chucking pins or spindles of the machine as distinguished from the previous practice of embedding sticks in the apples and using the sticks as handles during the coating operation. As is pointed out in these prior applications the coated apple without a stick has longer keeping properties and is therefore more desirable as a saleable article. Also pointed out is the fact that a successful coating of an apple with caramel and nut meats requires a rapid sequence operation which will apply the hot caramel to the apple in a minimum of time and immediately spin off excess caramel so that the heat does not damage the fresh fruit. If the crushed nut meats are to be applied to the caramel coating they must be applied immediately while the caramel is still warm and sticky.

The present invention relates primarily to the apparatus for applying the crushed nut meats but is directly related to the apparatus for dipping and spinning the apple in that it permits the use of an apple holding end conveying system that more positively controls the apple in the dipping and spinning operation. Not only must the crushed nut meats be applied to the apple immediately after the spinning operation but they must be pressed with some force into the fresh caramel coating and the apple must roll on a surface of the nut meats in order to apply a coating of nut meats completely around the apple.

The complete machine shown in Fig. 1 consists of a chain loop conveyor 1 supported to rotate in a vertical plane. Suitable supporting frame work is conventionally illustrated and consists of an upper rail 2 supported upon uprights 3—3. A first lower rail 4 supports and guides the beginning end of the lower reach of the conveyor and an intermediate lower rail 5 provided with uprights 6 on each end supports the intermediate portion of the lower reach of the conveyor. Hanger bars 7 depending from the upper rail 2 support the rail 8 beyond the intermediate rail 5. Suitable rollers or sprockets 9—9 carried by the rails and uprights guide the conveyor in the irregular loop path illustrated. As appears in Figs. 2, 4, 5 and 6 the conveyor 1 consists of spaced parallel chains 10 and 11 and the supporting frame work is correspondingly duplicated to support each chain.

Figure 4:
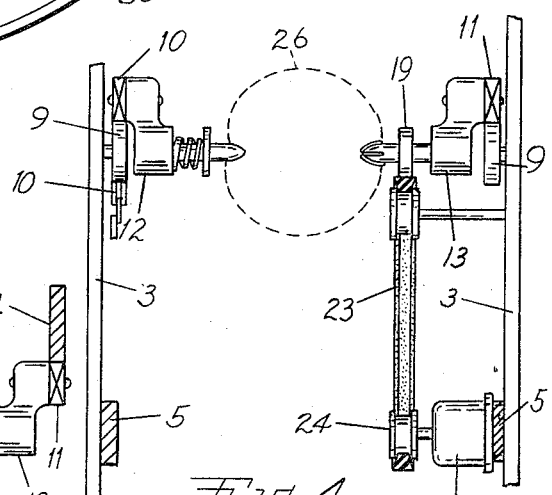
Fig. 4 is a fragmentary transverse vertical cross sectional view through the apple spinning apparatus of the machine taken along the plane of 4—4 in Fig. 1.
Figure 5:
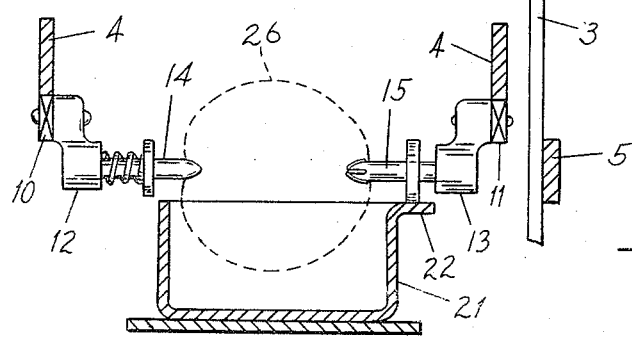
Fig. 5 is a fragmentary transverse cross sectional view through the caramel dipping portion of the machine taken along the plane of line 5—5 in Fig. 1.

The chains 10 and 11 are of any suitable construction to coact with the sprockets on rollers 9. The drawings conventionally illustrate chains of flat link construction and spaced links of a chain 10 appearing in the front of the machine in Fig. 1 have bearing brackets 12 secured to their inner sides and projecting toward the other side or loop of chain. Opposed links of the rear chain 11 have bearing brackets 13 secured thereto so that the brackets 12 and 13 are opposed and advanced in pairs. The brackets 12 rotatably support spindles 14 while the brackets 13 rotatably support opposed spindles 15. The spindles 14 have collars 16 which are engaged by springs 17 to yieldably urge the spindle inwardly toward the spindle 15. A head 18 limits inward motion of the spindles. The rear spindles 15 are axially fixed and provided with rollers 19 which are adapted to rotate the spindles 15 when the rollers are driven. Desirably the spindles 15 have driving teeth 20 on their ends which are adapted to grip the surface of an apple without the cutting or breaking the skin of the apple. As is shown in Figs. 2, 4 and 5 the opposed ends of the spindles 14 and 15 are adapted to be engaged in the opposite ends of a fresh apple.

The chains 10 and 11 are advanced in a counter clockwise direction as shown in Fig. 1 and advance the pairs of spindles first to the lower rails 4 where a dip tank 21 is supported underneath the path of motion of the spindles to immerse the lower portion of an apple held between the spindles. The roller 19 engages the rim 22 of the dip tank (see Fig. 5) or other fixed surface and causes the spindle and the apple to rotate as it is advanced along the tank. In operation, the dip tank is supplied with said liquid caramel of the desired temperature and consistency.

The rollers or sprockets supported by the uprights 6 on the intermediate lower rail 5 elevate the chains 10 and 11 to lift the apples out of the dip tank and advance the bearing brackets and spindles along an intermediate spinning station where a driven belt loop 23 engages the rollers 19 and rapidly spins the freshly coated apple to throw off the excess caramel. The belt 23 is supported upon suitable rollers 24 and driven by a motor 25.

Immediately upon passing the spinning station and the belt 23, the chains 10 and 11 are directed downwardly by sprockets or rollers on the ends of the lower rails 8 and directed across the peanut applying station as appears most clearly in Figs. 1, 2 and 3. In passing through the peanut coating station the apples indicated by the dotted lines at 26 are supported against upward displacement by the final rails 8 but are free to rotate in the bearing brackets 12 and 13 and are continuously advanced in a straight line by the chains. A rotatable carrier or table 27 supported upon a suitable shaft 28, is positioned below and to one side of the path of motion of the advancing apples. The shaft 28 is rotatably driven as by the gears 29 from a suitable speed reduction transmission 30 that also drives the conveyor chains 10 and 11 through the drive chain 31. A motor for driving the transmission is conventionally illustrated at 32. The carrier or table 27 thus rotates in timed relation to the conveyor chains 10 and 11.

Secured to and projecting above the carrier 27 are four pivot supports 33 arranged circularly around the center of the carrier. Each pivot support tiltably supports a radially projecting lever or arm 34 and each arm has a nut meat supporting pan 35 secured to its outer end. As appears most clearly from Fig. 3 the pans 35 are circularly arranged and segmental in shape and will be advanced by the rotating carrier 27 in generally tangent relation underneath the advancing spindles and the apples carried thereby. The pans taken together constitute a circular confection support which in the form illustrated is segmental.

The outer ends of the levers 34 and the pans 35 are biased upwardly from the carrier 27 as by counter weights 36 on the inner ends of the levers and by springs 37 acting on the levers outwardly from the pivot supports 33. Secured to one of the hanging frame bars 7 and projecting downwardly over the center of the rotatable carrier 27 is a fixed support bar 38 which has radial arms 39 (see Figs. 2 and 3) supporting a fixed guide rail 40. The guide rail 40 is generally circular and concentric with the carrier 27 and normally supports the inner ends of the levers 34 so that the pans 35 are depressed against the biasing action of the weights 36 and springs 37. However, there is a gap in the rear side of the guide rail 40 formed by downturned ends 41 on the rail which permits each lever arm to swing downwardly and each pan 35 to swing upwardly as it passes underneath the advancing apples. In operation the pans 35 are kept filled or covered on the bottom with crushed nut meats. The filling operation can be performed manually or by automatic apparatus (not illustrated). Regardless of the varying size of successive apples advancing along the conveyor 1, each freshly caramel coated apple will have a surface of crushed nut meats or confection pressed thereagainst with yieldable force and moved oppositely to the advancing motion of the apple so that the apple and its supporting spindles rotate in the brackets 12 and 13 to apply an even nut meat coating completely around the apple and firmly pressed into the fresh caramel coating. The guide rail 40 holds each pan 35 in depressed position until an apple is over the pan so there is no interference between the apple and the edge of the pan.

After passing the peanut applying station the brackets 12 and 13 and the apples carried thereby are advanced to a release or discharge point appearing in Fig. 6 where a depending release bar 42 secured to one of the frame members 3 projects in camming relation to the path of motion of the previously described collars 16 on the spindles 14. The spindles 14 are thus retracted against the compression of springs 17 and the freshly coated apple is released from between the spindles and falls to a suitable collecting mechanism such as the off-feed conveyor 43.

It is pointed out that while many of the elements of the present coating apparatus are the same as the elements of machines shown in the co-pending application identified at the beginning of this specification, there is a particularly desirable relation and co-action between the peanut applying mechanism and the apple advancing conveyor of the present application that permits the apparatus to run at high speed and therefore have an increased capacity. The bearing brackets 12 and 13 and the spindles 14 and 15 being carried solidly on the links of the chains 10 and 11 can be moved rapidly without causing vibration or deflection such as might release the apples from the spindles or damage the fresh fruit character of the apples. At the same time the peanuts are effectively applied to the freshly coated surfaces of the apples as they are advanced along this fixed path in a rapid and well controlled manner. Further the peanut applying portion of the apparatus functions with large or small apples and it is not necessary to adjust or vary the apple advancing conveyor to compensate for different sized apples.

The modified form of nut meat applying mechanism shown in Figs. 7, 8 and 9 differs functionally from the first form just described primarily by the fact that exact timing between the apple advancing conveyor and the rotating table for supporting the nut meat pans is not required. The nut meat supporting pans are at all times biased upwardly and rotate in elevated position except when forced downwardly by parts of the apple advancing conveyor to permit the apples to advance in a straight line over the ends of the pans.

In Fig. 7 there is illustrated a short length of the apple advancing conveyor 44 having spindle supporting brackets 45 at spaced intervals therealong. It will be appreciated that the conveyor 44 consists of two spaced parallel chains as in the first form of the conveyor and that the back chain supports spindle brackets 46 shown by dotted lines in Fig. 8. The spindles 47 of the front brackets and the spindles 48 of the rear brackets rotatably support the apples indicated by the dotted lines at 49. The conveyor 44 is inclined downwardly to a relatively short depressed reach 50 by the rollers 51 and the hold down rail 52.

Positioned below the depressed reach 50 and eccentric thereto is the horizontally rotatable table or carrier 53. The table is supported on the shaft 54 and rotated by the gears 55 from a transmission 56. As is indicated conventionally by the size of the gears the table is rotated at a relatively higher speed than the speed of the conveyor 44 which is also driven from the transmission by the chain 57. This speed differential, which will be described in greater detail later, can of course be effected by gearing in the transmission and by consideration of the radius of the table 53. A motor 58 drives the transmission.

The table 53 carries a plurality of angularly spaced pivots 59 which tiltably support radially extending arms or levers 60. The outer ends of the arms support segmental arcuate peanut pans 61 arranged in a circle under the path of advance of apples carried by the spindles as indicated by the dotted arrow at 62 in Fig. 8. The inner ends of the arms 60 are biased downwardly by weights 63 to lift the pans 61 normally above the level of the bottoms of the smallest apples carried by the spindles along the depressed reach 50 of the conveyor. The pans will thus press a layer of crushed nut meats carried by the pans against the surface of the apples by a yieldable force sufficient to press the nut meats into the soft, freshly applied caramel surfaces of the apples.

The downward incline of the conveyor 44 to the depressed reach 50 of the conveyor lowers the apples into the pans 61 which are rotated oppositely to the advancing motion of the apples. The rails 52 hold the spindles and apples depressed thus depressing the pans to create the desired pressure between the apples and the nut meats. Since the apples move downwardly into the circle of the pans there is no interference between the descending apples and the rotating edge of the pans. The ascending reach of the conveyor beyond the depressed reach similarly lifts the apples over the outer edge of the pans.

In order to prevent interference between the apples and the relatively oppositely moving end walls 64 of the pans, each pan carries an upwardly arched depressor bar 65 on its rear or trailing edge. As illustrated the bars 65 extend upwardly into the path of the spindles 47 so that as the spindles and an apple carried thereby approach the end walls 64 the leading pan 61 is cammed downwardly to let its trailing end wall pass under the apple. The depressor bars have laterally turned lugs 66 that overlie the inner side walls of the next succeeding or trailing pan so the trailing pan is also depressed for its leading end wall to clear the apple. After the spindle clears or moves past the depressor bar the leading pan moves up to its normal elevated position but the trailing pan moves upwardly only enough to press the peanuts on its bottom against the surface of the apple.

The relative speeds of the conveyor 44 and the pans 61 are important as the apples must roll on the peanuts in the pans rather than being slid along the pans in which case they would merely plow through the peanuts and not get an even coating completely therearound. Since apples are both advanced linearly by the conveyor 44 and rotated about their axes while advancing and since apples has circumferences between 6 and 9 inches, the surface of the pans 61 must move under and oppositely to the advancing motion of the apples at least as fast as the linear advance of the apple plus the peripheral rotating speed of the apples. The speed of rotation of the apples is of course variable but I have found that if the speed of the pans is about 6 times the speed of advance of the conveyor and opposite thereto, the apples are given an even annular coating of nut meats. With this speed relation each apple may pass through several of the pans 61 depending on the length of the pans. The several pans collectively form an annular nut meat support that is yieldably supported at angularly spaced points around its periphery and biased upwardly above the level of the advancing apples but capable of being depressed by the apples to apply pressure between the apples and the nut meats.

Having thus described the invention what is claimed as new and desired to secure by Letters Patent is:

1. In a machine for coating apples with caramel and nut meats the combination of a pair of parallel chain loops having upper and lower reaches supported to travel in vertical planes, a support for supporting said loops with a horizontal run in one reach thereof, pairs of opposed bearing brackets secured to the opposed sides of said chain loops, first spindles rotatably mounted in the brackets on one chain loop and spring biased inwardly to the other chain loop, second spindles rotatably mounted in the brackets on the other of said loops and having roller surfaces thereon, said spindles having opposed ends adapted to engage the opposite ends of an apple, a dip tank positioned below the lower reaches and along said horizontal run of said chains and therebetween and having an edge engageable with the said roller surfaces whereby apples carried by said spindles are rotated in said tank, a raised portion in the lower reaches of said chains positioned to elevate apples carried by said spindles out of said tank, a driven belt positioned along said raised portions and engageable with said roller surfaces to spin said spindles and apples carried thereby, a horizontally rotatable carrier positioned below and to one side of said loops beyond said belt, drive means connected to advance said chains and to rotate said carrier in time relation with the adjacent portions of the carrier and chains moving oppositely, a plurality of circularly arranged pans yieldably supported by said carrier and movable in vertical planes, means biasing said pans upwardly relative to said carrier, and means including a circular guide rail engageable with the support for said pans and opposing the action of said biasing means to hold said pans in lowered position, said guide rail having an interrupted portion permitting the pan under said chains to be raised by said biasing means to yieldably engage nut meats in the pan with apples carried by said spindles.

2. In a machine for coating apples with caramel and nut meats the combination of a pair of parallel chain loops having upper and lower reaches supported to travel in vertical planes, a support for supporting said loops with a horizontal run in one reach thereof, pairs of opposed bearing brackets secured directly to the spaced links of said chain loops, first spindles rotatably mounted in the brackets on one chain loop and spring biased inwardly toward the other chain loop, second spindles rotatably mounted in the brackets on the other of said loops and having roller surfaces thereon, said spindles having opposed ends adapted to engage the opposite ends of an apple, a dip tank positioned below the lower reaches and along said horizontal run of said chains and therebetween to receive the lower parts of apples supported by the ends of said pairs of spindles and having an edge engageable with the said roller surfaces to rotate apples carried by said spindles, a raised portion in the lower reaches of said chain positioned to elevate apples carried by said spindles out of said tank, a driven belt positioned along said raised portions and engageable with said roller surfaces to spin said spindles and apples carried thereby, a horizontally rotatable carrier positioned below and to one side of said chains and beyond said belt, drive means connected to advance said chains and to rotate said carrier in timed relation with the adjacent portions of the carrier and chains moving oppositely, a plurality of circularly arranged pans vertically movably supported by said carrier, means biasing said pans upwardly relative to said carrier, and means overcoming said first biasing means and biasing said pans to lowered position, said last means having an interrupted portion permitting the pan under said chains to be raised by said first biasing means to yieldably engage nut meats in the pan with apples carried by said spindles.

3. In a machine for coating apples with caramel and nut meats the combination of spaced conveyor chains positioned to move in parallel vertical loops having upper and lower reaches, a support for supporting said loops with a horizontal run in one reach thereof, pairs of opposed spindles rotatably mounted directly on said chains at spaced intervals and adapted to rotatably support apples between the spindles of each pair, one spindle of each pair being axially movable and biased toward the other, one spindle of each pair having a roller surface thereon, means including a dip tank located at one station along a horizontal run of said conveyor for applying a thin coating of heated caramel to apples carried by said spindles, means located at a second station along said chains for engaging said roller surfaces and spinning said spindle and apples carried thereby to throw off excess caramel while it is still warm and fluid, a horizontally rotatable carrier positioned below said chains beyond said spinning station, a plurality of pans arranged in a circle and vertically movably supported from said carrier with said chains extending across one side of the circle of the pans, drive means connected to advance said chains and rotate said carrier and said pans oppositely to the line of motion of the chains and in timed relation thereto, and means for elevating each of said pans as it passes under said chains to yieldably press nut meats carried by the pans against the sides of apples carried by said spindles.

4. In a machine for coating apples with caramel and nut meats the combination of spaced conveyor chains positioned to move in parallel vertical loops, pairs of opposed spindles rotatably mounted directly on links of said chains at spaced intervals and adapted to rotatably support apples between the spindles of each pair, means located at one station along said conveyor for applying a thin coating of heated caramel to apples carried by said spindles, means located at a second station along said chains for spinning said spindles and apples carried thereby to throw off excess caramel while it is still warm and fluid, a horizontally rotatable carrier positioned below said chains beyond said spinning station, a plurality of pans arranged in a circle and vertically movably supported from said carrier with said chains extending across one side of the circle of the pans, drive means connected to advance said chains and rotate said carrier and said pans oppositely to the line of motion of the chains and in timed relation thereto, and means for elevating each of said pans as it passes under said chains to yieldably press nut meats carried by the pans against the sides of apples carried by said spindles.

5. In a machine for coating apples with caramel and nut meats the combination of a conveyor positioned to move in a closed loop, pairs of opposed spindles rotatably mounted on said conveyor at spaced intervals and adapted to rotatably support apples between the spindles of each pair, one spindle of each pair having a roller surface thereon, means including a dip tank located at one station along said conveyor for applying a thin coating of heated caramel to apples carried by said spindles and having a rail engageable with said roller surfaces, means including a driven belt engageable with said roller surfaces located at a second station along said chains for spinning said spindle and apples carried thereby to throw off excess caramel while it is still warm and fluid, and a horizontally rotatable carrier positioned below said conveyor beyond said spinning station, a plurality of pans arranged in a circle and vertically movably supported from said carrier with said conveyor extending across one side of the circle of the pans, drive means connected to advance said conveyor and rotate said carrier and pans oppositely to the line of motion of the conveyor and in timed relation thereto, and means for elevating each of said pans as it passes under said conveyor to yieldably press nut meats carried by the pans against the sides of apples carried by said spindles.

6. In a machine for coating apples with caramel and nut meats the combination of a conveyor positioned to move in a closed loop, pairs of opposed spindles rotatably mounted on said conveyor at spaced intervals and adapted to rotatably support apples between the spindles of each pair, means located at one station along said conveyor for applying a thin coating of heated caramel to apples carried by said spindles, means located at a second station along said chains for spinning said spindle and apples carried thereby to throw off excess caramel while it is still warm and fluid, and a horizontally rotatable carrier positioned below said conveyor beyond said spinning station, a plurality of pans arranged in a circle and vertically movably supported from said carrier with said conveyor extending across one side of the circle of the pans, drive means connected to advance said conveyor and rotate said carrier and said pans oppositely to the line of motion of the conveyor and in timed relation thereto, and means for elevating each of said pans as it passes under said conveyor to yieldably press nut meats carried by the pans against the sides of apples carried by said spindles.

7. In combination with an apple coating machine having a conveyor with pairs of opposed spindles arranged to advance apples through a dipping and spinning process and then through inclined paths to and from a depressed reach, confection applying mechanism comprising a rotatable carrier positioned below and to one side of said depressed reach, a plurality of radially extending arms vertically tiltably mounted on said carrier and biased downwardly at their inner ends, segmental confection pans supported on the outer ends of said arms and arranged in a circle with one side passing under said depressed reach, means connected to rotate said carrier and said pans with the pans under the depressed reach moving oppositely to and faster than the conveyor, and means for depressing said pans in timed relation with said spindles to pass the end walls of the pans under apples advanced by said spindles, said means including upwardly arched depressor bars secured to the trailing ends of each of said pans and extending upwardly to be engaged by the spindles and extending rearwardly into overhanging relation to the leading end of the next succeeding pan.

8. In combination with an apple coating machine having a conveyor with pairs of opposed spindles arranged to advance apples through a dipping and spinning process and then through inclined paths to and from a depressed reach, confection applying mechanism comprising a rotatable carrier positioned below and to one side of said depressed reach, a plurality of radially extending arms vertically tiltably mounted on said carrier and biased downwardly at their inner ends, segmental confection pans supported on the outer ends of said arms and arranged in a circle with one side passing under said depressed reach, means connected to rotate said carrier and said pans with the pans under the depressed reach moving oppositely to the conveyor, and means depressing said pans in timed relation with said spindles to pass the end walls of the pans under apples advanced by said spindles.

9. In combination with an apple coating machine having a conveyor with pairs of opposed spindles arranged to advance apples through a dipping and spinning process and then through inclined paths to and from a depressed reach, confection applying mechanism comprising a rotatable carrier positioned below and to one side of said depressed reach, a plurality of radially extending arms vertically tiltably mounted on said carrier and biased downwardly at their inner ends, means forming a confection support on the outer ends of said arms and arranged in a circle with one side passing under said depressed reach, and means connected to rotate said carrier and said confection support with the portion of the confection support under the depressed reach moving oppositely to the conveyor.

10. In combination with an apple coating machine having a conveyor with pairs of opposed spindles arranged to advance apples through a dipping and spinning process and then through inclined paths to and from a depressed reach, confection applying mechanism comprising a rotatable carrier positioned below and to one side of said depressed reach, a circular confection support rotatably driven by said carrier, means vertically tiltably and yieldably supporting said confection support in centered relation above said carrier with one side of the confection support under said depressed reach at a level above the bottoms of apples carried by said spindles whereby the apples depress the confection support, and means connected to rotate said carrier and said confection support with the portion of the confection support under the depressed reach moving oppositely to the conveyor.

11. In combination with an apple coating machine having a conveyor with pairs of opposed spindles arranged to advance apples through a dipping and spinning process and then through inclined paths to and from a depressed reach, confection applying mechanism comprising a rotatable carrier positioned below and to one side of said depressed reach, segmental confection pans yieldably supported from said carrier and arranged in a circle with one side passing under said depressed reach, means connected to rotate said carrier and said pans with the pans under the depressed reach moving oppositely to and faster than the conveyor, and means for depressing said pans in timed relation with said spindles to pass the end walls of the pans under apples advanced by said spindles, said means including upwardly arched depressor bars secured to the trailing ends of each of said pans and extending upwardly to be engaged by the spindles and extending rearwardly into overhanging relation to the leading end of the next succeeding pan.

12. In combination with an apple coating machine having a conveyor with pairs of opposed spindles arranged to advance apples through a dipping and spinning process and then through inclined paths to and from a depressed reach, confection applying mechanism comprising a rotatable carrier positioned below and to one side of said depressed reach, segmental confection pans yieldably supported from said carrier and arranged in a circle with one side passing under said depressed reach, means connected to rotate said carrier and said pans with the pans under the depressed reach moving oppositely to and faster than the conveyor, and means for depressing said pans in timed relation with said spindles to pass the end walls of the pans under apples advanced by said spindles.

References Cited in the file of this patent
UNITED STATES PATENTS 1,166,071     Mettler et al.     Dec. 28, 1915